United States Patent
Liu

(10) Patent No.: US 11,206,627 B2
(45) Date of Patent: Dec. 21, 2021

(54) SYSTEM INFORMATION TRANSMISSION METHOD AND DEVICE

(71) Applicant: BEIJING XIAOMI MOBILE SOFTWARE CO., LTD., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 166 days.

(21) Appl. No.: 16/499,099

(22) PCT Filed: Apr. 27, 2017

(86) PCT No.: PCT/CN2017/082220
§ 371 (c)(1),
(2) Date: Sep. 27, 2019

(87) PCT Pub. No.: WO2018/195863
PCT Pub. Date: Nov. 1, 2018

(65) Prior Publication Data
US 2020/0045662 A1   Feb. 6, 2020

(51) Int. Cl.
*H04W 56/00* (2009.01)
*H04W 16/28* (2009.01)
*H04W 72/04* (2009.01)

(52) U.S. Cl.
CPC ........ *H04W 56/0015* (2013.01); *H04W 16/28* (2013.01); *H04W 72/042* (2013.01); *H04W 72/046* (2013.01)

(58) Field of Classification Search
CPC ......... H04W 74/0833; H04W 74/0816; H04W 72/1278; H04W 56/006; H04W 48/12; H04W 48/16; H04L 5/0092; H04L 5/0051
See application file for complete search history.

(56) References Cited

U.S. PATENT DOCUMENTS

2017/0094624 A1   3/2017   Balachandran
2018/0198555 A1*  7/2018   Wu ..................... H04L 1/0009
(Continued)

FOREIGN PATENT DOCUMENTS

CN   103782636 A   5/2014
CN   106326292 A   1/2017

OTHER PUBLICATIONS

International Search Report (including English translation) and Written Opinion issued in PCT/CN2017/082220, dated Oct. 27, 2017, 8 pages.

*Primary Examiner* — Iqbal Zaidi
(74) *Attorney, Agent, or Firm* — Arch & Lake LLP

(57) ABSTRACT

Provided are a system information transmission method and device, and a computer-readable storage medium, relating to the technical field of communications. The method comprises: sending a synchronization block and a system information block in a plurality of different directions by means of a beam, wherein the synchronization block comprises a synchronization signal, first system information, and position indication information about the system information block; the system information block refers to a system information block that is sent after the synchronization block, has the same direction as the synchronization block and is closest thereto in a time domain; the position indication information indicates a time-domain position or a time-domain position and a frequency-domain position where the system information block is located, and the system information block comprises an analytic parameter of a new radio physical downlink control channel (NR-PDCCH) where second system information is located, or the second system information.

14 Claims, 6 Drawing Sheets

(56) References Cited

U.S. PATENT DOCUMENTS

2020/0021420 A1\* 1/2020 Li ........................ H04W 72/04
2020/0068549 A1\* 2/2020 Kang ................... H04B 7/0695

\* cited by examiner

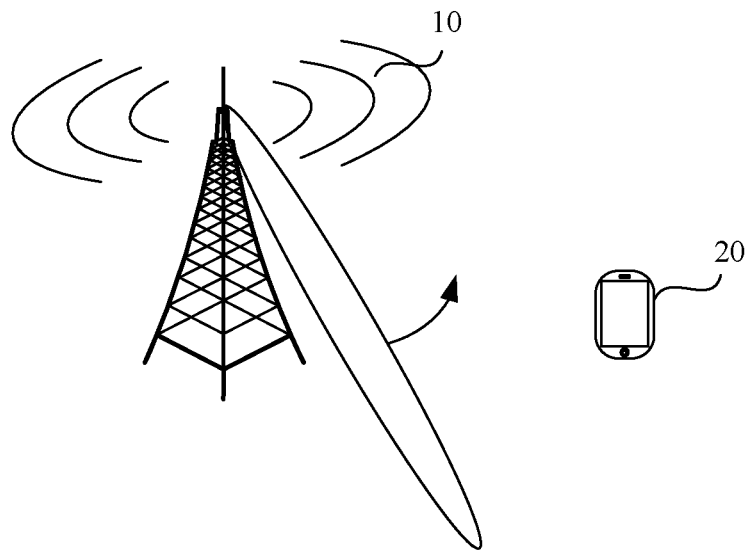

FIG. 1A

```
┌─────────────────────────────────────────────────┐ 101
│ SSBs and system information blocks are sent in a │
│  plurality of different directions through beams │
└─────────────────────────────────────────────────┘
```

FIG. 1B

```
┌─────────────────────────────────────────────────────────┐ 201
│ When an SSB sent by a base station through a beam is received, a │
│ synchronization signal, first system information, and position indication │
│ information of a system information block being received the fastest are │
│               acquired from the SSB                     │
└─────────────────────────────────────────────────────────┘
                          │
                          ▼
┌─────────────────────────────────────────────────────────┐ 202
│ A time-frequency position of the system information block is determined │
│           based on the position indication information  │
└─────────────────────────────────────────────────────────┘
                          │
                          ▼
┌─────────────────────────────────────────────────────────┐ 203
│ The system information block is received at the time-frequency position │
└─────────────────────────────────────────────────────────┘
                          │
                          ▼
┌─────────────────────────────────────────────────────────┐ 204
│ Second system information is acquired based on the system information block │
└─────────────────────────────────────────────────────────┘
```

SYSTEM INFORMATION TRANSMISSION METHOD AND DEVICE

CROSS REFERENCE TO RELATED APPLICATION

The present application is the U.S. national phase of PCT Application No. PCT/CN2017/082220 filed on Apr. 27, 2017, which is incorporated herein by reference in its entirety.

TECHNICAL FIELD

The present disclosure generally relates to the technical field of communication, and more particularly, to a method and a device for transmitting system information.

BACKGROUND

In a communication system, a base station is usually required to send system information to a UE (User Equipment) within a service range thereof, to enable the UE to access a communication network. The system information may include the most important and most common transmission parameter of the communication system, random access related information and the like.

At present, a method for transmitting system information is proposed in discussions about standardization of the Fifth Generation Mobile Communication Technology (5G), which is specifically as follows: a base station sends a Synchronization Signal Block (SSB) through a beam, namely sending the SSB to scanned UE in a beam scanning manner. The SSB is located in a synchronization burst, the synchronization burst may include SSBs sent by beams in multiple different directions, and the UE may usually receive the SSB in its own direction only. Moreover, each SSB includes a synchronization signal and system information, and the UE, after receiving the SSB in its own direction, may acquire the synchronization signal and the system information from the SSB. The synchronization signal is used to ensure that the UE may be synchronized with the base station in time and frequency.

SUMMARY

For solving the technical problem in a related art, embodiments of the present disclosure provide a method, device and a computer-readable storage medium for transmitting system information. The technical solutions are implemented as follows.

According to a first aspect, there is provided a method for transmitting system information, which may be applied to a base station and include that:

SSBs and system information blocks are sent in multiple different directions through beams, wherein the SSB may include a synchronization signal, first system information, and position indication information of the system information block, the system information block may refer to a system information block that is sent after the SSB and is in the same direction as that of the SSB and is closest in a time domain to the SSB, the position indication information may be used to indicate a time-domain position where the system information block is located, or the time-domain position and a frequency-domain position where the system information block is located, and the system information block may include a parsing parameter for a New Radio Physical Downlink Control Channel (NR-PDCCH) where second system information is located or the second system information.

Accord to a second aspect, there is provided a method for transmitting system information, which may be applied to a UE and include that:

when an SSB sent by a base station through a beam is received, a synchronization signal, first system information, and position indication information of a system information block being received the fastest are acquired from the SSB, wherein the system information block may include a parsing parameter for an NR-PDCCH where second system information is located or the second system information, the position indication information may be used to indicate a time-domain position where the system information block is located, or the time-domain position and a frequency-domain position where the system information block is located, and the system information block may be sent by the base station through the beam;

a time-frequency position of the system information block is determined based on the position indication information;

the system information block is received at the time-frequency position; and the second system information is acquired based on the system information block.

According to a third aspect, there is provided a device for transmitting system information, which may include:

a processor;

a memory configured to store an instruction executable for the processor, wherein the processor may be configured to:

send SSBs and system information blocks in multiple different directions through beams, wherein the SSB may include a synchronization signal, first system information, and position indication information of the system information block, the system information block may refer to a system information block that is sent after the SSB and is in the same direction as that of the SSB and is closest in a time domain to the SSB, the position indication information may be used to indicate a time-domain position where the system information block is located, or the time-domain position and a frequency-domain position where the system information block, and the system information block may include a parsing parameter for an NR-PDCCH where second system information is located or the second system information.

According to a fourth aspect, there is provided a device for transmitting system information, which may include:

a processor;

a memory configured to store an instruction executable for the processor, wherein the processor may be configured to:

when an SSB sent by a base station through a beam is received, acquire, from the SSB, a synchronization signal, first system information, and position indication information of a system information block being received the fastest, wherein the system information block may include a parsing parameter for an NR-PDCCH where second system information is located or the second system information, the position indication information may be used to indicate a time-domain position where the system information block is located, or the time-domain position and a frequency-domain position where the system information block is located, and the system information block may be sent by the base station through the beam;

determine a time-frequency position of the system information block based on the position indication information;

receive the system information block at the time-frequency position; and acquire the second system information based on the system information block.

The technical solutions provided by the embodiments of the present disclosure have the following beneficial effects.

In the embodiments of the present disclosure, the base station may send the SSBs and the system information blocks in the multiple different directions through the beams. The SSB includes not only the first system information, but also the position indication information of the system information block that is sent after the SSB and is in the same direction as that of the SSB and is closest in the time domain to the SSB. The system information block includes the parsing parameter for the NR-PDCCH where the second system information is located or the second system information. Part of system information is sent in the SSB, and other system information is sent outside of the SSB, so that all the system information may be sent, and the problem that not all the system information may be sent in a limited space of the SSB is solved. Moreover, the position of the system information block is indicated in the SSB, so that the UE may determine the position where to receive the system information block, and the system information transmission efficiency is improved.

BRIEF DESCRIPTION OF THE DRAWINGS

In order to describe the technical solutions in the embodiments of the present disclosure more clearly, the accompanying drawings required to be used for descriptions about the embodiments will be simply introduced below. It is apparent that the accompanying drawings described below are only some embodiments of the present disclosure. Those of ordinary skill in the art may further obtain other accompanying drawings according to these accompanying drawings without creative work.

FIG. 1A is a schematic diagram illustrating a communication system according to an implementary embodiment.

FIG. 1B is a flow chart showing a method for transmitting system information according to an exemplary embodiment.

FIG. 2 is a flow chart showing a method for transmitting system information according to another exemplary embodiment.

DETAILED DESCRIPTION

Figure 3A:
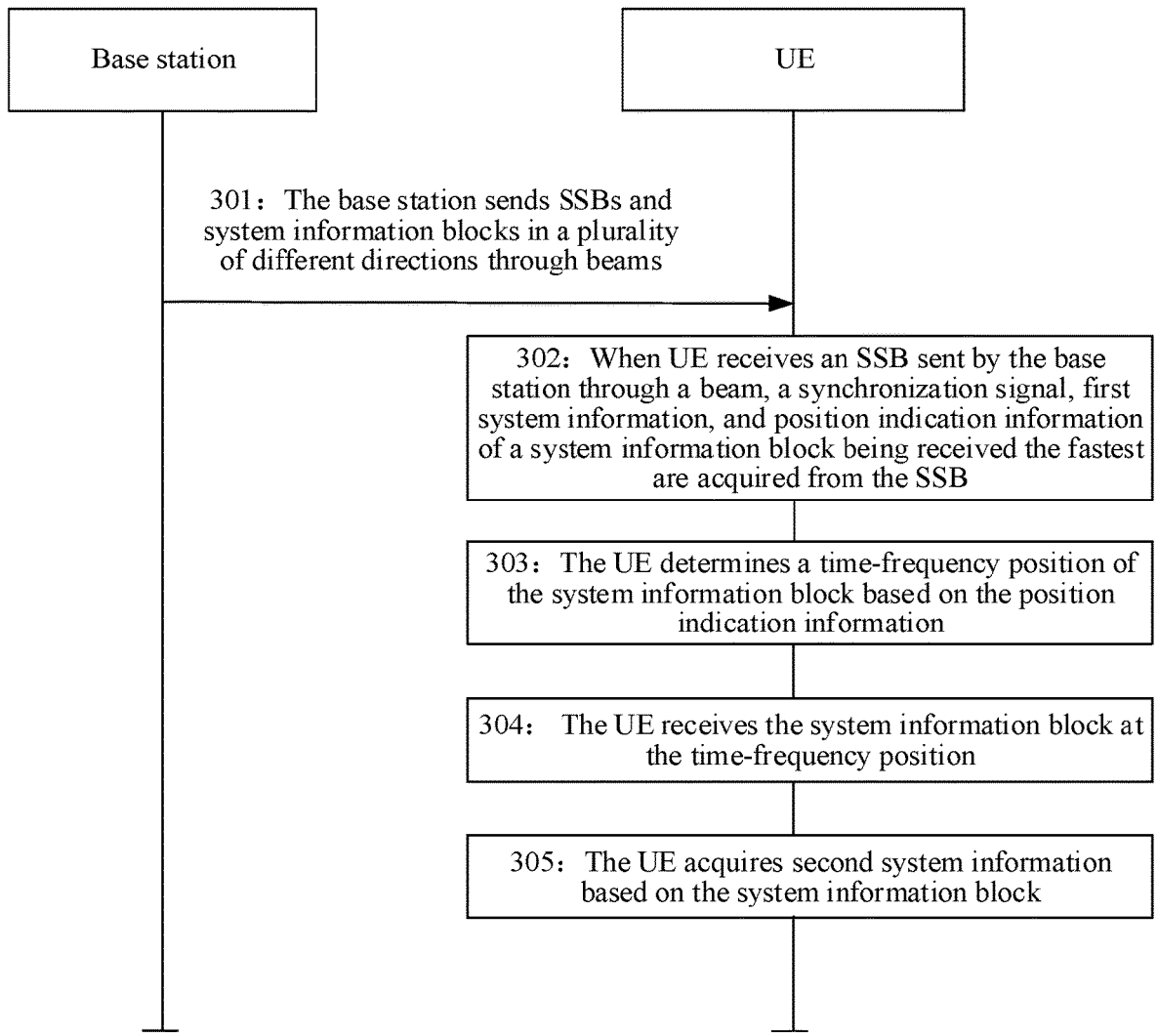
FIG. 3A is a flow chart showing a method for transmitting system information according to still another exemplary embodiment.

For making the purposes, technical solutions and advantages of the present disclosure clearer, implementation modes of the present disclosure will further be described below in combination with the accompanying drawings in detail.

First of all, terms involved in the embodiments of the present disclosure are explained.

SSB: it is sent by a base station through a beam, and includes a synchronization signal and system information. The SSB in the embodiments of the present disclosure not only includes the synchronization signal and the system information, but also includes position indication information of a system information block. Moreover, the SSB only includes part of the system information, and the RSI is sent through the system information block.

System information block: it is also sent by the base station through the beam, and includes the RSI or a parsing parameter for an NR-PDCCH where the RSI is located.

Synchronization burst: in a process of sending SSBs through beams, the beam may pause after keeping scanning for a period of time and then continue scanning after pausing for a certain period of time, and in a continuous scanning and pausing process, the synchronization burst may be formed in the continuous scanning time, and synchronization burst includes the SSBs sent in multiple different directions during the continuous scanning time.

Index of the SSB: it is used to indicate a direction and time-domain position of the SSB.

Then, an application scenario of the embodiments of the present disclosure is introduced.

A method provided in the embodiments of the present disclosure is applied to a scenario (for example, applied to a 5G communication system) where system information is sent through a beam. In the related art, a base station may send an SSB through a beam, the SSB including a synchronization signal and system information. However, due to a limited space of the SSB, the SSB may only contain part of system information, which makes it impossible for the base station to send all system information to UE.

For the problem that not all system information may be sent in a limited space of an SSB, the embodiments of the present disclosure provide a method for transmitting system information, namely an SSB and a system information block are sent through a beam, the SSB including position indication information of the system information block and first system information, and the system information block including a parsing parameter for an NR-PDCCH where the second system information is located or the second system information. Therefore, all the system information may be sent by use of an existing SSB sending mechanism.

Finally, an implementation environment of the embodiments of the present disclosure is introduced.

The method provided in the embodiments of the present disclosure is applied to a communication system. FIG. 1A is a schematic diagram illustrating a communication system according to an implementary embodiment. Referring to FIG. 1A, the communication system includes a base station 10 and UE 20, and the base station 10 may be connected with the UE 20 through a communication network.

The base station 10 may perform beam scanning on a served region. For example, the base station may send a beam shown in FIG. 1A, start scanning counterclockwise from a position shown in FIG. 1A and send SSBs in different directions through beams in a process of performing beam scanning in different directions. Correspondingly, scanned UE may receive the SSB sent by the base station through the beam, and the UE may only receive the SSB in its own direction. As shown in FIG. 1A, the UE 20 may receive the SSB sent by the base station through the beam only when beam scanning is performed at a position where the UE 20 is located.

FIG. 1B is a flow chart showing a method for transmitting system information according to an exemplary embodiment. The method is applied to a base station. Referring to FIG. 1A, the method includes the following operations.

In block 101, SSBs and system information blocks are sent in multiple different directions through beams.

The SSB includes a synchronization signal, first system information, and position indication information of the system information block, the system information block refers to a system information block that is sent after the SSB and is in the same direction as that of the SSB and is closest in a time domain to the SSB, the position indication information is used to indicate a time-domain position where the system information block is located, or the time-domain position and a frequency-domain position where the system information block is located, and the system information block includes a parsing parameter for an NR-PDCCH where second system information is located or the second system information.

In the embodiment of the present disclosure, the base station may send the SSBs and the system information blocks in the multiple different directions through the beams, the SSB not only including the first system information but also including the position indication information of the system information block that is sent after the SSB and is in the same direction as that of the SSB and is closest in the time domain to the SSB; and the system information block including the parsing parameter for the NR-PDCCH where the second system information is located or the second system information. Part of system information is sent in the SSB, and RSI is sent outside of the SSB, so that all the system information may be sent, and the problem that not all the system information may be sent in a limited space of the SSB is solved. Moreover, the position of the system information block is indicated in the SSB, so that UE may determine the position where to receive the system information block, and the system information transmission efficiency is improved.

Optionally, the position indication information includes an index of the SSB, an index of a reference SSB and a relative time difference.

The index of the SSB is used to indicate the direction and a time-domain position of the SSB, the reference SSB refers to an SSB that is sent before the system information block and is in the same direction as that of the system information block and is closest in the time domain to the system information block, and the relative time difference refers to a time difference between the reference SSB and the system information block.

Optionally, the position indication information further includes a frequency-domain difference, and the frequency-domain difference refers to a difference between the frequency-domain position where the system information block is located and a frequency-domain position where the SSB is located.

All of the optional technical solutions may be freely combined into optional embodiments of the present disclosure, which will not be elaborated herein one by one in the embodiments of the present disclosure.

FIG. 2 is a flow chart showing a method for transmitting system information according to an exemplary embodiment. The method is applied to UE. Referring to FIG. 2, the method includes the following operations.

In block 201, when an SSB sent by a base station through a beam is received, a synchronization signal, first system information, and position indication information of a system information block being received the fastest are acquired from the SSB.

The system information block includes a parsing parameter for an NR-PDCCH where second system information is located or the second system information, the position indication information is used to indicate a time-domain position where the system information block is located, or the time-domain position and a frequency-domain position where the system information block is located, and the system information block is sent by the base station through the beam.

In block 202, a time-frequency position of the system information block is determined based on the position indication information.

In block 203, the system information block is received at the time-frequency position.

In block 204, the second system information is acquired based on the system information block.

In the embodiment of the present disclosure, when the UE receives the SSB sent by the base station through the beam, the SSB not only including the first system information but also including the position indication information of the system information block being received the fastest, the UE may determine the time-frequency position of the system information block based on the position indication information, receive the system information block at the determined time-frequency position and acquire the second system information based on the system information block. Therefore, all system information may be received, and the problem that not all the system information may be transmitted in a limited space of the SSB is solved. Moreover, the position of the system information block is indicated in the SSB, so that UE may determine the position where to receive the system information block, blind detection of the UE is avoided, and system information transmission efficiency is improved.

Optionally, the position indication information includes an index of the SSB, an index of a reference SSB and a relative time difference.

The index of the SSB is used to indicate a direction and a time-domain position of the SSB, the reference SSB refers to an SSB that is sent before the system information block and is in the same direction as that of the system information block and is closest in a time domain to the system information block, and the relative time difference refers to a time difference between the reference SSB and the system information block.

The operation that the time-frequency position of the system information block is determined based on the first system information and the position indication information includes that:

a stored sending period of the SSB and sending period of the system information block are acquired;

an absolute time difference between the SSB and the system information block is determined based on the sending period of the SSB, the sending period of the system information block, the index of the SSB, the index of the reference SSB and the relative time difference;

the time-domain position where the system information block is located is determined based on the absolute time difference; and the frequency-domain position where the system information block is located is determined.

Optionally, the operation that the absolute time difference between the SSB and the system information block is determined based on the sending period of the SSB, the sending period of the system information block, the index of the SSB, the index of the reference SSB and the relative time difference includes that:

an SSB time difference between the SSB and the reference SSB is determined based on the sending period of the SSB, the sending period of the system information block, the index of the SSB and the index of the reference SSB; and the SSB time difference is added to the relative time difference to obtain the absolute time difference.

Optionally, the position indication information further includes a frequency-domain difference, and the frequency-domain difference refers to a difference between the frequency-domain position where the system information block is located and a frequency-domain position where the SSB is lcoated.

The operation that the frequency-domain position of the system information block is determined includes that:

a stored frequency-domain position of the SSB is acquired; and the frequency-domain position where the system information block is located is determined based on the frequency-domain position of the SSB and the frequency-domain difference.

Optionally, the operation that the second system information is acquired based on the system information block includes that:

when the system information includes the parsing parameter for the NR-PDCCH where the second system information is located, the NR-PDCCH where the second system information is located is parsed according to the parsing parameter for the NR-PDCCH where the second system information is located to obtain a parsing parameter for a PDSCH carried by the NR-PDCCH; and the PDSCH is parsed according to the parsing parameter for the PDSCH to obtain the second system information transmitted through the PDSCH.

All of the optional technical solutions may be freely combined into optional embodiments of the present disclosure, which will not be elaborated herein one by one in the embodiments of the present disclosure.

FIG. 3A is a flow chart showing a method for transmitting system information according to another exemplary embodiment. Interaction entities of the method are a base station and a UE respectively. Referring to FIG. 3A, the method includes the following operations.

In block 301, the base station sends SSBs and system information blocks in multiple different directions through beams.

The SSB in each direction includes a synchronization signal, first system information, and position indication information of the system information block, the system information block refers to a system information block that is sent after the SSB and is in the same direction as that of the SSB and is closest in a time domain to the SSB, the position indication information is used to indicate a time-domain position where the system information block is located, or the time-domain position and a frequency-domain position where the system information block is located, and the system information block in each direction includes a parsing parameter for an NR-PDCCH where second system information is located or the second system information.

The NR-PDCCH is a 5G NR PDCCH, i.e., a 5G-standard-based PDCCH.

In a practical application, the position indication information of the system information block and the first system information are located in a Physical Broadcast Channel (PBCH) of the SSB, that is, the SSB includes the synchronization signal and the PBCH, and the PBCH includes the position indication information of the system information block and the first system information.

The first system information is part of system information, and may be, for example, system information sent through a Master Information Block (MIB) in an existing Long Term Evolution (LTE) communication system, i.e., the most important and most common transmission parameter of the communication system. The second system information is RSI, except the first system information, also required to be sent by the communication system, and may be random access related information and the like.

The base station may send the SSB and the system information block on different time-frequency resources through different beams. For example, the SSB may be sent on a first time-frequency resource through a beam, the system information block may be sent on a second time-frequency resource through a beam, and the first time-frequency resource is different from the second time-frequency resource.

The base station may periodically send the SSB and the system information block through the beam. Sending periods of the SSB and the system information block may be preset by the base station or set by negotiation of the base station and the UE.

In a process of sending the SSBs, the base station may periodically send synchronization bursts through the beams, each synchronization burst including the SSBs in the multiple different directions. Correspondingly, the base station may also periodically send the system information blocks through the beams. For convenient description, in the embodiment of the present disclosure, system information blocks continuously sent in a period are called a system information burst, the system information burst including the system information blocks in the multiple different directions.

Figure 3B:
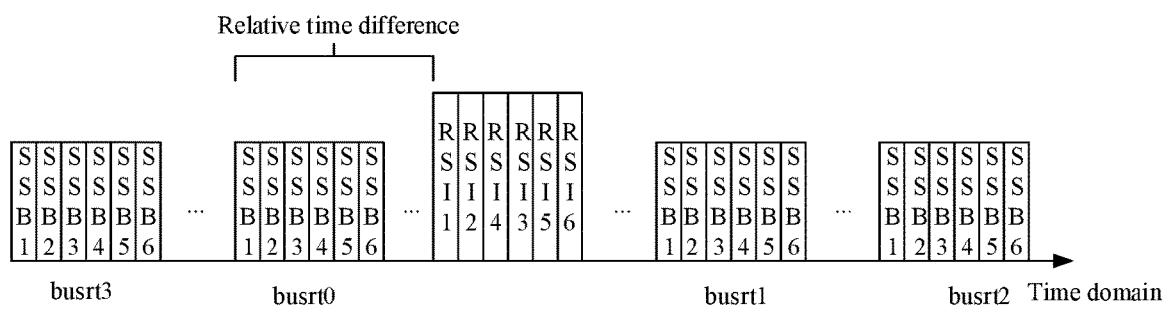
FIG. 3B is a schematic diagram illustrating transmission of SSBs and system information blocks according to an exemplary embodiment.

If a sending period of the synchronization burst is 5 ms, namely the synchronization burst is sent every 5 ms, each synchronization burst includes six SSBs, a sending period of the system information burst is 20 ms, namely the system information burst is sent every 20 ms, and each system information burst also includes six system information blocks, a schematic diagram illustrating sending of the SSBs and the system information blocks may be shown in FIG. 3B.

FIG. 3B is a schematic diagram illustrating transmission of SSBs and system information blocks in a 20 ms period. Referring to FIG. 3B, the base station may send four synchronization bursts within 20 ms, sequentially burst3, burst0, burst1 and burst2, and send a system information burst after bursa Each synchronization burst includes six SSBs, i.e., SSB1-SSB6 respectively, and the system information burst includes six system information blocks, i.e., RSI1-RSI6 respectively, the SSB and the RSI with the same number being in the same direction.

It is to be noted that each SSB includes position information of the system information block that is sent after the SSB and is in the same direction as that of the SSB and is closest in a time domain to the SSB. As shown in FIG. 3B, SSB1 in burst0 includes position indication information of RSI1 that is sent thereafter, and SSB1 in burst3 also includes the position indication information of RSI1 that is sent after thereafter.

The position indication information of the system information block is set in each SSB to accurately indicate a receiving position of the system information block to the UE, namely indicating the position where to receive the system information block to the UE, so that blind detection of the UE may be avoided, and system information transmission efficiency may be improved. In addition, indicating the receiving position of the system information block to each UE in another complex manner such as a signaling manner is also avoided, and a signaling burden of the communication system is reduced.

The position indication information of the system information block may be used to indicate the time-domain position of the system information block, and the frequency-domain position of the system information block may be a predetermined fixed frequency-domain position, or, the position indication information of the system information block may indicate both the time-domain position and frequency-domain position of the system information block. There are no limits made thereto in the embodiment of the present disclosure.

In a possible implementation mode, the position indication information of the system information block in the SSB may include an index of the SSB, an index of a reference SSB and a relative time difference, to indicate the time-domain position where the system information block is located. The index of the SSB is used to indicate the direction and a time-domain position of the SSB, the reference SSB refers to an SSB that is sent before the system information block and is in the same direction as that of the system information block and is closest in the time domain to the system information block, and the relative time difference refers to a time difference between the reference SSB and the system information block. The relative time difference may be certain time-domain units on the time domain, for example, one or more symbols, mini-slots, slots, subframes, radio frames or other time-domain resources granularities.

As shown in FIG. 3B, since SSB1 in burst0 is an SSB in the same direction as that of the RSI1 sent thereafter and is closest in the time domain to RSI1 sent thereafter, SSB1 in burst0 is a reference SSB. If a time difference between SSB1 and RSI1 is Δt, the position indication information of the system information block in SSB1 in burst0 includes an index of SSB1 in burst0, an index of the reference SSB1 in burst0, and Δt. Correspondingly, the position indication information of the system information block in SSB1 in burst3 includes an index of SSB1 in burst3, the index of the reference SSB1 in burst0, and Δt.

In addition, the position indication information may further be used to indicate the time-domain position of the system information block.

A first implementation mode: the position indication information may include a reference frequency-domain position and a frequency-domain difference, and the frequency-domain difference refers to a difference between the frequency-domain position where the system information block is located and the reference frequency-domain position.

The reference frequency-domain position may include a reference frequency-domain starting position and a reference frequency-domain ending position, and the frequency-domain difference includes a difference between a frequency-domain position starting position where the system information block is located and the reference frequency-domain starting position where the system information block is located, and a difference between a frequency-domain ending position where the system information block is located and the reference frequency-domain ending position where the system information block is located. Or, a bandwidth of the frequency-domain position where the system information block is located is fixed, and the reference frequency-domain position and the frequency-domain difference may include any one of the above two.

A second implementation mode: the position indication information may include the frequency-domain difference, and the frequency-domain difference refers to the difference between the frequency-domain position where the system information block is located and a frequency-domain position where the SSB is located.

The frequency-domain difference may include a difference between frequency-domain starting positions where the system information block is located and the SSB is located and a difference between frequency-domain ending positions where the system information block is located and the SSB is located. Or, the frequency-domain starting positions where the system information block is located and the SSB is located are the same, and the frequency-domain difference only includes the difference between the frequency-domain ending positions where the system information block is located and the SSB is located. Or, the frequency-domain ending positions where the system information block is located and the SSB is located are the same, and the frequency-domain difference only includes the difference between the frequency-domain starting positions where the system information block is located and the SSB is located.

The frequency-domain difference may be certain frequency-domain units on a frequency domain, for example, one or more Resource Elements (REs), Resource Blocks (RBs) or other frequency-domain resources granularities.

In block 302, when the UE receives an SSB sent by the base station through a beam, a synchronization signal, first system information, and position indication information of a system information block being received the fastest are acquired from the SSB.

The UE, when being required to receive system information, may detect the SSBs sent by the base station through the beams to acquire the system information from the SSBs, and time when the system information is required to be received is usually time of starting, cell access, cell handover or the like.

Since the UE may only receive the SSB in its own direction, the UE may keep trying to detect the SSBs at first and, when detecting and receiving the SSB, may acquire the synchronization signal, the first system information, and the position indication information of the system information block being received the fastest from the SSB.

In block 303, the UE determines a time-frequency position of the system information block based on the position indication information.

The UE may determine the time-frequency position of the system information block according to the position indication information, acquired from the SSB, of the system information block being received the fastest.

If the position indication information includes the index of the SSB, the index of the reference SSB and the relative time difference, the operation that the UE determines the time-frequency position of the system information block based on the position indication information includes operations 3031-3034.

In operation 3031, a stored sending period of the SSB and sending period of the system information block are acquired.

The sending period of the SSB and the sending period of the system information block may be present to the UE by the base station, and the UE, after receiving the sending period of the SSB and the sending period of the system information block, may locally store them.

In operation 3032, an absolute time difference between the SSB and the system information block is determined based on the sending period of the SSB, the sending period of the system information block, the index of the SSB, the index of the reference SSB and the relative time difference.

The operation that the absolute time difference between the SSB and the system information block is determined based on the sending period of the SSB, the sending period of the system information block, the index of the SSB, the index of the reference SSB and the relative time difference includes that: an SSB time difference between the SSB and the reference SSB is determined based on the sending period of the SSB, the sending period of the system information block, the index of the SSB and the index of the reference SSB; and the SSB time difference is added to the relative time difference to obtain the absolute time difference.

A synchronization burst where the SSB is located and the specific SSB in the synchronization burst may be determined respectively according to the sending period of the SSB, the sending period of the system information block, the index of the SSB and the index of the reference SSB. For example, referring to FIG. 3B, if the SSB is SSB2 in burst3 and the reference SSB is SSB2 in burst0, the absolute time difference is the sending period 5 ms of the synchronization burst. If the relative time difference is 3 ms, the absolute time difference between the SSB and the system information block is 8 ms.

In operation 3033, the time-domain position where the system information block is located is determined based on the absolute time difference.

The absolute time difference refers to a time difference between the SSB presently received by the UE and the system information block being received the fastest, so that the UE may receive the system information block after the absolute time difference of present time.

In operation 3034, the frequency-domain position where the system information block is located is determined.

The operation that the frequency-domain position where the system information block is located is determined includes the following implementation modes.

In a first implementation mode, if the frequency-domain position where the system information block is located is the predetermined fixed frequency-domain position, a stored frequency-domain position of the system information block is acquired. The frequency-domain position of the system information block may be present by the base station.

In a second implementation mode, if the position indication information includes the reference frequency-domain position and the frequency-domain difference, the frequency-domain difference referring to the difference between the frequency-domain position where the system information block is located and the reference frequency-domain position, the stored reference frequency-domain position and frequency-domain difference are acquired, and the frequency-domain position where the system information block is located is determined based on the reference frequency-domain position and the frequency-domain difference.

In a third implementation mode, if the position indication information includes the frequency-domain difference, the frequency-domain difference referring to the difference between the frequency-domain position where the system information block is located and the frequency-domain position where the SSB is located, a stored frequency-domain position of the SSB is acquired, and the frequency-domain position where the system information block is located is determined based on the frequency-domain position of the SSB and the frequency-domain difference.

In block 304, the UE receives the system information block at the time-frequency position.

In block 305, the UE acquires the second system information based on the system information block.

The operation that the UE acquires the second system information based on the system information block includes the following two implementation modes.

In a first implementation mode, if the system information block includes the second system information, the second system information is directly acquired from the system information block.

In a second implementation mode, if the system information block includes the parsing parameter for the NR-PDCCH where the second system information is located, the NR-PDCCH where the second system information is located is parsed according to the parsing parameter for the NR-PDCCH where the second system information is located to obtain a parsing parameter for a PDSCH carried by the NR-PDCCH; and the PDSCH is parsed according to the parsing parameter for the PDSCH to obtain the second system information transmitted through the PDSCH.

The parsing parameter for the NR-PDCCH may include a time-frequency position of the NR-PDCCH, so that the position where the NR-PDCCH is located may be determined according to the parsing parameter for the NR-PDCCH, and the NR-PDCCH is parsed to obtain the parsing parameter for the PDSCH carried by the NR-PDCCH. The parsing parameter for the PDSCH may include a demodulation parameter for the PDSCH, so that the PDSCH may be demodulated according to the parsing parameter for the PDSCH to obtain the second system information transmitted through the PDSCH.

Since the parsing parameter for the NR-PDCCH where the second system information is located occupies a relatively small space, occupation of a relatively large space of the SSB may be avoided, and transmission in the SSB is facilitated.

In the embodiment of the present disclosure, when the UE receives the SSB sent by the base station through the beam, the SSB not only including the first system information but also including the position indication information of the system information block being received the fastest, the UE may determine the time-frequency position of the system information block based on the position indication information, receive the system information block at the determined time-frequency position and acquire the second system information based on the system information block. Therefore, all system information may be received, and the problem that not all the system information may be transmitted in a limited space of the SSB is solved. Moreover, the position of the system information block is indicated in the SSB, so that the UE may determine the position where to receive the system information block, blind detection of the UE is avoided, and system information transmission efficiency is improved.

Figure 4:
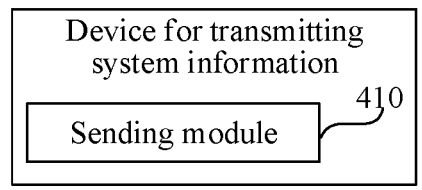
FIG. 4 is structure diagram of a device for transmitting system information according to an exemplary embodiment.

FIG. 4 is a structure diagram of a device for transmitting system information, according to an exemplary embodiment. The device may be implemented by software, hardware or a combination of the two. The device may be a base station. As shown in FIG. 4, the device includes:

a sending module 410, configured to send SSBs and system information blocks in multiple different directions through beams.

The SSB includes a synchronization signal, first system information, and position indication information of the system information block, the system information block refers to a system information block that is sent after the SSB and is in the same direction as that of the SSB and is closest in a time domain to the SSB, the position indication information is used to indicate a time-domain position where the system information block is located, or the time-domain position and a frequency-domain position where the system information block is located, and the system information block includes a parsing parameter for an NR-PDCCH where second system information is located or the second system information.

In the embodiment of the present disclosure, the device may send the SSBs and the system information blocks in the multiple different directions through the beams, the SSB not only including the first system information but also including the position indication information of the system information block that is sent after the SSB and is in the same in direction as that of the SSB and is closest in the time domain to the SSB; and the system information block including the parsing parameter for the NR-PDCCH where the second system information is located or the second system information. Part of system information is sent in the SSB, and RSI is sent outside of the SSB, so that all the system information may be sent, and the problem that not all the system information may be sent in a limited space of the SSB is solved. Moreover, the position of the system information block is indicated in the SSB, so that UE may determine the position where to receive the system information block, and system information transmission efficiency is improved.

Optionally, the position indication information includes an index of the SSB, an index of a reference SSB and a relative time difference.

The index of the SSB is used to indicate the direction and a time-domain position of the SSB, the reference SSB refers to an SSB that is sent before the system information block and is in the same direction as that of the system information block and is closest in the time domain to the system information block, and the relative time difference refers to a time difference between the reference SSB and the system information block.

Optionally, the position indication information further includes a frequency-domain difference, and the frequency-domain difference refers to a difference between the frequency-domain position where the system information block is located and a frequency-domain position where the SSB is located.

Figure 5A:
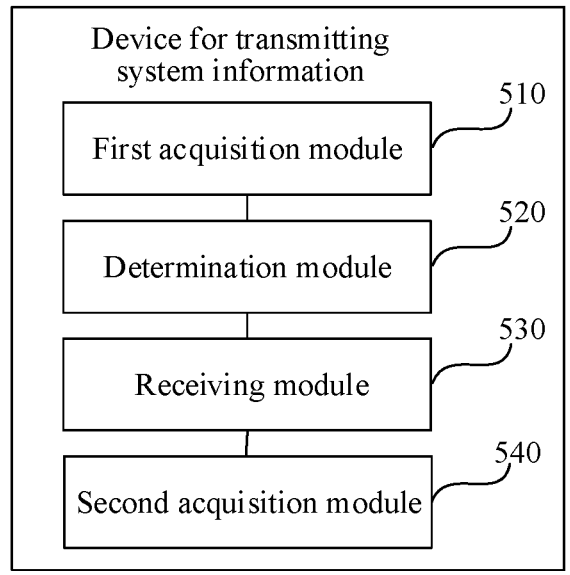
FIG. 5A is structure diagram of a device for transmitting system information according to an exemplary embodiment.

FIG. 5A is a structure diagram of a device for transmitting system information according to an exemplary embodiment. The device may be implemented by software, hardware or a combination of the two. The device may be UE. As shown in FIG. 5A, the device includes:

a first acquisition module 510, configured to, when an SSB sent by a base station through a beam is received, acquire, from the SSB, a synchronization signal, first system information, and position indication information of a system information block being received the fastest, the system information block including a parsing parameter for an NR-PDCCH where second system information is located or the second system information, the position indication information being used to indicate a time-domain position where the system information block is located, or the time-domain position and a frequency-domain position where the system information block is located, and the system information block being sent by the base station through the beam;

a determination module 520, configured to determine a time-frequency position of the system information block based on the position indication information;

a receiving module 530, configured to receive the system information block at the time-frequency position; and a second acquisition module 540, configured to acquire the second system information based on the system information block.

In the embodiment of the present disclosure, when the SSB sent by the base station through the beam is received, the SSB not only including the first system information but also including the position indication information of the system information block being received the fastest, the time-frequency position of the system information block may be determined based on the position indication information; the system information block is received at the determined time-frequency position; and the second system information is acquired based on the system information block. Therefore, all system information may be received, and the problem that not all the system information may be transmitted in a limited space of the SSB is solved. Moreover, the position of the system information block is indicated in the SSB, so that a receiver may determine the position where to receive the system information block, blind detection of the receiver is avoided, and system information transmission efficiency is improved.

Figure 5B:
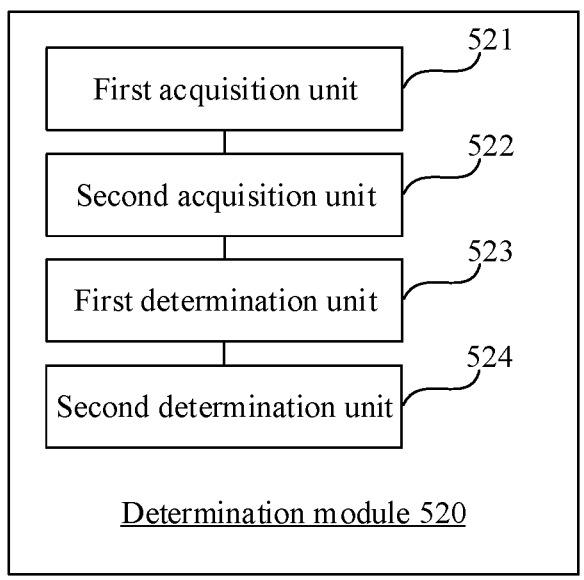
FIG. 5B is a structure diagram of a determination module 520 according to an exemplary embodiment.

Optionally, referring to FIG. 5B, the position indication information includes an index of the SSB, an index of a reference SSB and a relative time difference.

The index of the SSB is used to indicate a direction and a time-domain position of the SSB, the reference SSB refers to an SSB that is sent before the system information block and is in the same direction as that of the system information block and is closest in a time domain to the system information block, and the relative time difference refers to a time difference between the reference SSB and the system information block.

The determination module 520 includes:

a first acquisition unit 521, configured to acquire a stored sending period of the SSB and sending period of the system information block, a second acquisition unit 522, configured to determine an absolute time difference between the SSB and the system information block based on the sending period of the SSB, the sending period of the system information block, the index of the SSB, the index of the reference SSB and the relative time difference;

a first determination unit 523, configured to determine the time-domain position where the system information block is located based on the absolute time difference; and a second determination unit 524, configured to determine the frequency-domain position where the system information block is lcoated.

Optionally, the second acquisition unit 522 is specifically configured to:

determine an SSB time difference between the SSB and the reference SSB based on the sending period of the SSB, the sending period of the system information block, the index of the SSB and the index of the reference SSB; and add the SSB time difference to the relative time difference to obtain the absolute time difference.

Optionally, the position indication information further includes a frequency-domain difference, and the frequency-domain difference refers to a difference between the frequency-domain position where the system information block is located and a frequency-domain position where the SSB is located.

The second determination unit 524 is specifically configured to:

acquire a stored frequency-domain position of the SSB; and determine the frequency-domain position where the system information block is located based on the frequency-domain position of the SSB and the frequency-domain difference.

Figure 5C:
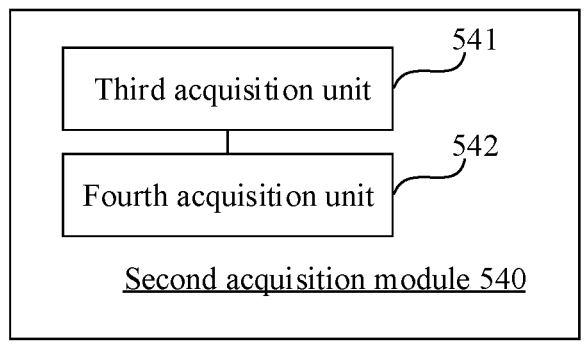
FIG. 5C is a structure diagram of a second acquisition module 540 according to an exemplary embodiment.

Optionally, referring to FIG. 5C, the second acquisition module 540 includes:

a third acquisition unit 541, configured to, if the system information includes the parsing parameter for the NR-PDCCH where the second system information is located, parse the NR-PDCCH where the second system information is located according to the parsing parameter for the NR-PDCCH where the second system information is located to obtain a parsing parameter for a PDSCH carried by the NR-PDCCH; and a fourth acquisition unit 542, configured to parse the PDSCH according to the parsing parameter for the PDSCH to obtain the second system information transmitted through the PDSCH.

Figure 6:
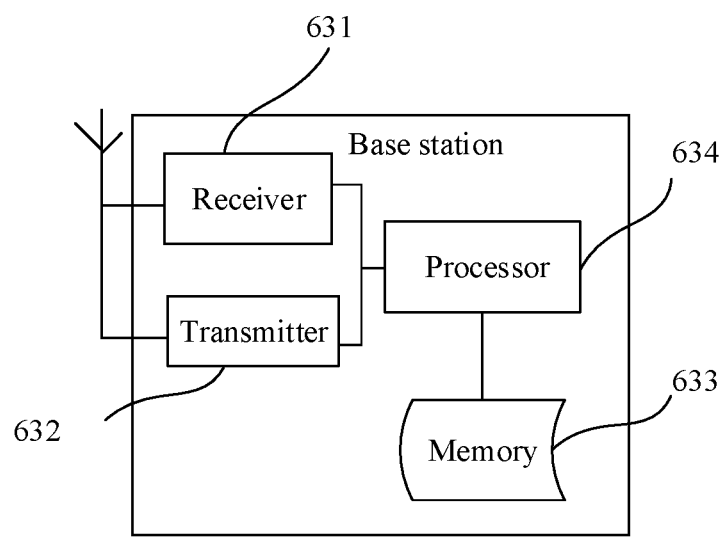
FIG. 6 is a structure diagram of a base station according to an exemplary embodiment.

FIG. 6 is a structure diagram of a base station according to an exemplary embodiment. The base station is configured to implement the method for transmitting system information provided in the present disclosure, and includes a receiver 631, a transmitter 632, a memory 633 and a processor 634 connected with the receiver 631, the transmitter 632 and the memory 633 respectively. The processor 634 is configured to execute the methods provided in the embodiments shown in FIG. 1-FIG. 3A.

In an exemplary embodiment, there is also provided a non-transitory computer-readable storage medium including an instruction, such as the memory 633 including an instruction, and the instruction may be executed by the processor 634 of the base station to implement the methods in the embodiments shown in FIG. 1-FIG. 3A. For example, the non-transitory computer-readable storage medium may be a Read-Only Memory (ROM), a Random Access Memory (RAM), a Compact Disc Read-Only Memory (CD-ROM), a magnetic tape, a floppy disc, an optical data storage device and the like.

According to a non-transitory computer-readable storage medium, when an instruction in the storage medium is executed by a processor of a base station, the base station may execute the methods for service multiplexing transmission provided in the embodiments shown in FIG. 1-FIG. 3A.

Figure 7:
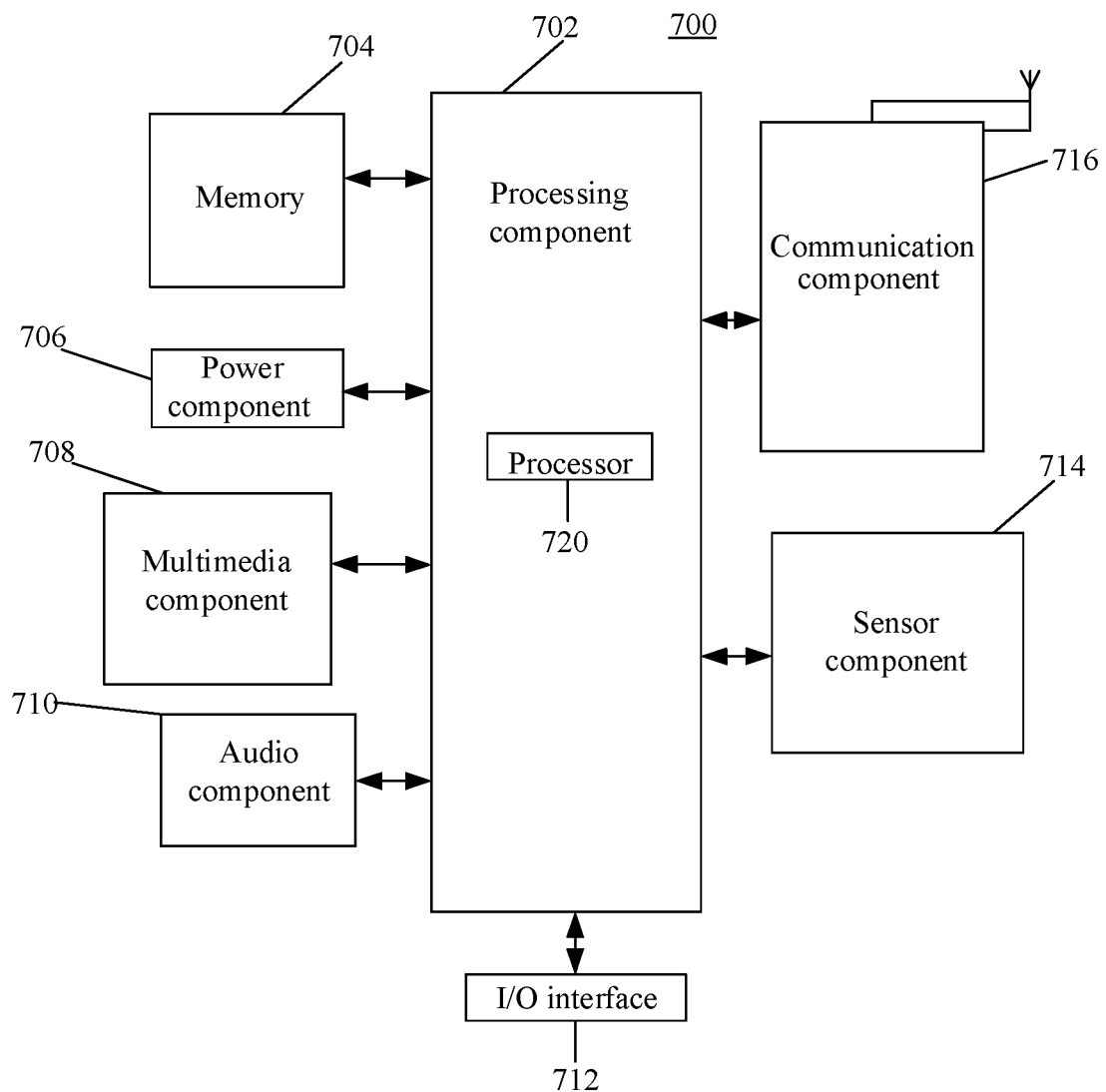
FIG. 7 is a structure diagram of UE 700 according to an exemplary embodiment.

FIG. 7 is a structure diagram of UE 700 according to an exemplary embodiment. For example, the UE 700 may be a mobile phone, a computer, a digital broadcast terminal, a messaging device, a gaming console, a tablet, a medical device, exercise equipment, a personal digital assistant and the like.

Referring to FIG. 7, the UE 700 may include one or more of the following components: a processing component 702, a memory 704, a power component 706, a multimedia component 708, an audio component 710, an Input/Output (I/O) interface 712, a sensor component 714, and a communication component 716.

The processing component 702 typically controls overall operations of the UE 700, such as the operations associated with display, telephone calls, data communications, camera operations, and recording operations. The processing component 702 may include one or more processors 720 to execute instructions to perform all or part of the steps in the abovementioned method. Moreover, the processing component 702 may include one or more modules which facilitate interaction between the processing component 702 and the other components. For instance, the processing component 702 may include a multimedia module to facilitate interaction between the multimedia component 708 and the processing component 702.

The memory 704 is configured to store various types of data to support the operation of the UE 700. Examples of such data include instructions for any application programs or methods operated on the UE 700, contact data, phonebook data, messages, pictures, video, etc. The memory 704 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a ROM, a magnetic memory, a flash memory, and a magnetic or optical disk.

The power component 706 provides power for various components of the UE 700. The power component 706 may include a power management system, one or more power supplies, and other components associated with generation, management and distribution of power for the UE 700.

The multimedia component 708 includes a screen providing an output interface between the UE 700 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 708 includes a front camera and/or a rear camera. The front camera and/or the rear camera may receive external multimedia data when the UE 700 is in an operation mode, such as a photographing mode or a video mode. Each of the front camera and the rear camera may be a fixed optical lens system or have focusing and optical zooming capabilities.

The audio component 710 is configured to output and/or input an audio signal. For example, the audio component 710 includes a Microphone (MIC), and the MIC is configured to receive an external audio signal when the UE 700 is in the operation mode, such as a call mode, a recording mode and a voice recognition mode. The received audio signal may further be stored in the memory 704 or sent through the communication component 716. In some embodiments, the audio component 710 further includes a speaker configured to output the audio signal.

The I/O interface 712 provides an interface between the processing component 702 and a peripheral interface module, and the peripheral interface module may be a keyboard, a click wheel, buttons and the like. The buttons may include, but not limited to: a home button, a volume button, a starting button and a locking button.

The sensor component 714 includes one or more sensors configured to provide status assessment in various aspects for the UE 700. For instance, the sensor component 714 may detect an on/off status of the UE 700 and relative positioning of components, such as a display and small keyboard of the UE 700, and the sensor component 714 may further detect a change in a position of the UE 700 or a component of the UE 700, presence or absence of contact between the user and the UE 700, orientation or acceleration/deceleration of the UE 700 and a change in temperature of the UE 700. The sensor component 714 may include a proximity sensor configured to detect presence of an object nearby without any physical contact. The sensor component 714 may also include a light sensor, such as a Complementary Metal Oxide Semiconductor (CMOS) or Charge Coupled Device (CCD) image sensor, configured for use in an imaging application. In some embodiments, the sensor component 714 may also include an acceleration sensor, a gyroscope sensor, a magnetic sensor, a pressure sensor or a temperature sensor.

The communication component 716 is configured to facilitate wired or wireless communication between the UE 700 and another device. The UE 700 may access a communication-standard-based wireless network, such as a Wireless Fidelity (WiFi) network, a 2nd-Generation (2G) or 3rd-Generation (3G) network or a combination thereof. In an exemplary embodiment, the communication component 716 receives a broadcast signal or broadcast associated information from an external broadcast management system through a broadcast channel. In an exemplary embodiment, the communication component 716 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the UE 700 may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the methods provided in the embodiments shown in FIG. 1-FIG. 3A.

In an exemplary embodiment, there is also provided a non-transitory computer-readable storage medium including an instruction, such as the memory 704 including an instruction, and the instruction may be executed by the processor 720 of the UE 700 to implement the abovementioned method. For example, the non-transitory computer-readable storage medium may be a ROM, a RAM, a CD-ROM, a magnetic tape, a floppy disc, an optical data storage device and the like.

According to a non-transitory computer-readable storage medium, when an instruction in the storage medium is executed by a processor of UE 700, the UE 700 may execute the methods provided in the embodiments shown in FIG. 1-FIG. 3A.

Those of ordinary skill in the art should know that implementation of all or part of the steps of the abovementioned embodiments may be completed through hardware and may also be completed through related hardware instructed by a program. The program may be stored in a computer-readable storage medium. The storage medium may be a ROM, a magnetic disk, an optical disc or the like.

The above is only the preferred embodiment of the present disclosure and not intended to limit the present disclosure. Any modifications, equivalent replacements, improvements and the like made within the spirit and principle of the present disclosure shall fall within the scope of protection of the present disclosure.

What is claimed is:

1. A method for a transmission of system information, the method being applied to a base station and comprising:
   sending Synchronization Signal Blocks (SSBs) and system information blocks in a plurality of different directions through beams,
   wherein at least one SSB comprises a synchronization signal, first system information, and position indication information of a corresponding system information block,
   wherein the corresponding system information block is sent after the SSB, in the same direction as the SSB, and is closest in a time domain to the SSB,
   wherein the position indication information is used to indicate either a time-domain position where the corresponding system information block is located, or the time-domain position and a frequency-domain position where the corresponding system information block is located, and
   wherein the corresponding system information block comprises a parsing parameter for a New Radio Physical Downlink Control Channel (NR-PDCCH) where a second system information is located or the second system information itself;
   wherein the position indication information further comprises an index of the SSB, an index of a reference SSB and a relative time difference;
   wherein the index of the SSB is used to indicate a direction and a time-domain position of the SSB,
   wherein the reference SSB refers to an SSB that is sent before the corresponding system information block, in the same direction as the corresponding system information block, and is closest in a time domain to the corresponding system information block, and
   wherein the relative time difference refers to a time difference between the reference SSB and the corresponding system information block.

2. The method of claim 1, wherein the position indication information further comprises a frequency-domain difference, wherein the frequency-domain difference refers to a difference between the frequency-domain position where the corresponding system information block is located and a frequency-domain position where the SSB is located.

3. A method for a reception of system information, the method being applied to a User Equipment (UE) comprising:
   receiving, from a base station through a beam, a Synchronization Signal Block (SSB)
   wherein the SSB comprises a synchronization signal, first system information, and position indication information of a system information block being received the fastest,
   wherein the system information block comprises a parsing parameter for a New Radio Physical Downlink Channel (NR-PDCCH) where a second system information is located or the second system information itself,
   wherein the position indication information is used to either indicate a time-domain position, or a time-domain position and a frequency-domain position where the system information block is located;
   determining a time-frequency position of the system information block based on the position indication information;
   receiving, from a base station through a beam, the system information block at the time-frequency position; and
   acquiring the second system information based on the system information block;

wherein the position indication information further comprises an index of the SSB, an index of a reference SSB and a relative time difference;
wherein the index of the SSB is used to indicate a direction and a time-domain position of the SSB,
wherein the reference SSB refers to an SSB that is sent before the system information block, in the same direction as the system information block, and is closest in a time domain to the system information block, and
wherein the relative time difference refers to a time difference between the reference SSB and the system information block.

4. The method of claim 3,
wherein determining the time-frequency position of the system information block based on the position indication information further comprises:
acquiring a stored sending period from the SSB and a sending period from the system information block,
determining an absolute time difference between the SSB and the system information block based on the sending period of the SSB, the sending period of the system information block, the index of the SSB, the index of the reference SSB, and the relative time difference,
determining the time-domain position where the system information block is located based on the absolute time difference, and
determining the frequency-domain position where the system information block is located.

5. The method of claim 4, wherein determining the absolute time difference between the SSB and the system information block based on the sending period of the SSB, the sending period of the system information block, the index of the SSB, the index of the reference SSB, and the relative time difference further comprises:
determining an SSB time difference between the SSB and the reference SSB based on the sending period of the SSB, the sending period of the system information block, the index of the SSB, and the index of the reference SSB; and
adding the SSB time difference to the relative time difference to obtain the absolute time difference.

6. The method of claim 4, wherein the position indication information further comprises a frequency-domain difference, wherein the frequency-domain difference refers to a difference between the frequency-domain position where the system information block is located and a frequency-domain position where the SSB is located; and
determining the frequency-domain position where the system information block is located further comprises:
acquiring a stored frequency-domain position from the SSB, and
determining the frequency-domain position where the system information block is located based on the frequency-domain position of the SSB and the frequency-domain difference.

7. The method of claim 3, wherein acquiring the second system information based on the system information block further comprises:
when the system information comprises the parsing parameter for the NR-PDCCH where the second system information is located, parsing the NR-PDCCH where the second system information is located according to the parsing parameter for the NR-PDCCH where the second system information is located to obtain a parsing parameter for a Physical Downlink Shared Channel (PDSCH) carried by the NR-PDCCH; and parsing the PDSCH according to the parsing parameter for the PDSCH to obtain the second system information transmitted through the PDSCH.

8. A device for a transmission of system information, comprising:
one or more processors;
tangible, non-transitory computer-readable memory configured to store an instruction executable for the one or more processors,
wherein the one or more processors are configured to:
send Synchronization Signal Blocks (SSBs) and system information blocks in a plurality of different directions through beams,
wherein at least one SSB comprises a synchronization signal, first system information, and position indication information of a corresponding system information block,
wherein the corresponding system information block is sent after the at least one SSB, in the same direction as the at least one SSB, and is closest in a time domain to the at least one SSB,
wherein the position indication information is used to indicate a time-domain position where the corresponding system information block is located, or the time-domain position and a frequency-domain position where the corresponding system information block is located, and
wherein the corresponding system information block comprises a parsing parameter for a New Radio Physical Downlink Control Channel (NR-PDCCH) where second system information is located or the second system information itself;
wherein the position indication information further comprises an index of the SSB, an index of a reference SSB and a relative time difference;
wherein the index of the SSB is used to indicate a direction and a time-domain position of the SSB,
wherein the reference SSB refers to an SSB that is sent before the corresponding system information block, in the same direction as the corresponding system information block, and is closest in a time domain to the corresponding system information block, and
wherein the relative time difference refers to a time difference between the reference SSB and the corresponding system information block.

9. The device of claim 8, wherein the position indication information further comprises a frequency-domain difference, and wherein the frequency-domain difference refers to a difference between the frequency-domain position where the system information block is located and a frequency-domain position where the SSB is located.

10. A device for a reception of system information, comprising:
one or more processors;
tangible, non-transitory computer-readable memory configured to store instructions executable by the one or more processors,
wherein the one or more processors are configured to:
when a Synchronization Signal Block (SSB) is received from a base station through a beam, acquire, from the SSB, a synchronization signal, first system information, and position indication information of a system information block being received the fastest,
wherein the system information block comprises a parsing parameter for a New Radio Physical Downlink Channel (NR-PDCCH) where second system information is located or the second system information itself, wherein the position indication information is used to indicate a time-domain position where the system information block is located, or the time-domain position and a frequency-domain position where the system information block is located, and wherein the system information block is sent by the base station through the beam;

determine a time-frequency position of the system information block based on the position indication information;

receive the system information block at the time-frequency position; and acquire the second system information based on the system information block;

wherein the position indication information further comprises an index of the SSB, an index of a reference SSB and a relative time difference;

wherein the index of the SSB is used to indicate a direction and a time-domain position of the SSB, wherein the reference SSB refers to an SSB that is sent before the system information block, in the same direction as the system information block, and is closest in a time domain to the system information block, and wherein the relative time difference refers to a time difference between the reference SSB and the system information block.

11. The device of claim 10, wherein
the one or more processors are further configured to:
acquire a stored sending period from the SSB and a sending period from the system information block;
determine an absolute time difference between the SSB and the system information block based on the sending period of the SSB, the sending period of the system information block, the index of the SSB, the index of the reference SSB and the relative time difference;
determine the time-domain position where the system information block is located based on the absolute time difference; and
determine the frequency-domain position where the system information block is located.

12. The device of claim 11, the one or more processors are further configured to:
determine an SSB time difference between the SSB and the reference SSB based on the sending period of the SSB, the sending period of the system information block, the index of the SSB and the index of the reference SSB; and
add the SSB time difference to the relative time difference to obtain the absolute time difference.

13. The device of claim 11, wherein the position indication information further comprises a frequency-domain difference, wherein the frequency-domain difference refers to a difference between the frequency-domain position where the system information block is located and a frequency-domain position where the SSB is located; and
the one or more processors are further configured to:
acquire a stored frequency-domain position from the SSB; and
determine the frequency-domain position where the system information block is located based on the frequency-domain position of the SSB and the frequency-domain difference.

14. The device of claim 10, the one or more processors are further configured to:
when the system information block comprises the parsing parameter for the NR-PDCCH where the second system information is located, parse the NR-PDCCH where the second system information is located according to the parsing parameter for the NR-PDCCH where the second system information is located to obtain a parsing parameter for a Physical Downlink Shared Channel (PDSCH) carried by the NR-PDCCH; and
parse the PDSCH according to the parsing parameter for the PDSCH to obtain the second system information transmitted through the PDSCH.

* * * * *